A. M. Allen,
Toy Velocipede.
No. 3739. Reissued Nov. 23. 1869.
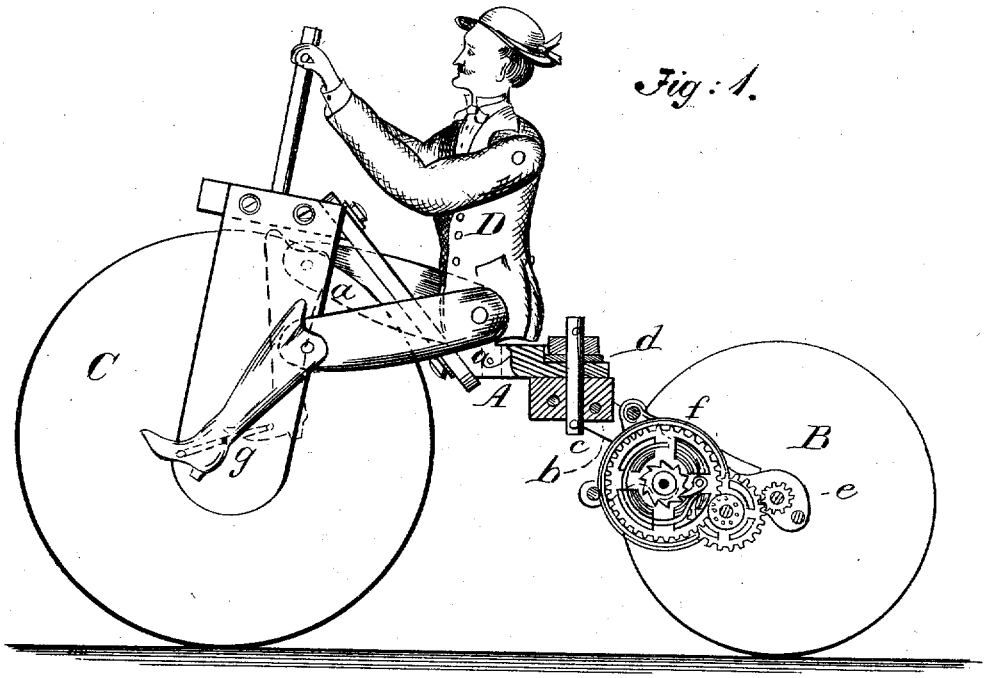
Fig: 2
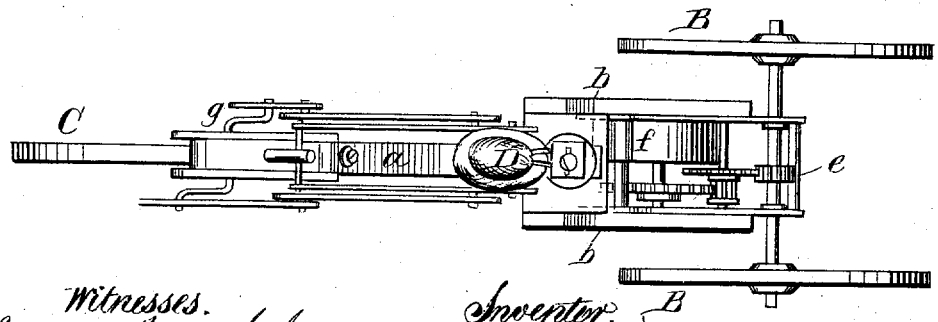
Witnesses.
Ernest F. Kastenhuber
Chas Wahlers
Inventor:
A. M. Allen
by
Van Santvoord & Hauff
Attys
N. PETERS, PHOTO-LITHOGRAPHER, WASHINGTON, D. C.

United States Patent Office.

ARTHUR M. ALLEN, OF NEW YORK, N. Y.

*Letters Patent No.* 94,058, *dated August* 24, 1869; *reissue No.* 3,739, *dated November* 23, 1869.

MECHANICAL VELOCIPEDE.

The Schedule referred to in these Letters Patent and making part of the same.

*To all whom it may concern:*

Be it known that I, ARTHUR M. ALLEN, of the city, county, and State of New York, have invented a new and improved Mechanical Velocipede; and I do hereby declare the following to be a full, clear, and exact description thereof, which will enable those skilled in the art to make and use the same, reference being had to the accompanying drawing, forming part of this specification, in which drawing—

Figure 1 represents a sectional side elevation of this invention.

Figure 2 is a plan or top view thereof.

Similar letters indicate corresponding parts.

This invention relates to a velocipede which is provided with a spring or other motive-power, and the reach of which is made in two parts, connected by a swivel and nut or other suitable joint, in such a manner, that by bringing the two parts of the reach in an angular position toward each other, the velocipede is caused to run on a curve or in a circle; and by bringing the two parts of the reach in a straight line, and by these means a velocipede is obtained, which, when set for a circle, can be used in a room, being propelled by its own motive-power, and which can also be set for and used on a straight course. The front part of the reach forms a saddle, which supports the image of a human figure, the legs of which are connected to cranks secured to the axle of the front wheel, so that as the velocipede is propelled, the image imitates the motions of a person riding on a velocipede.

A represents the reach of my velocipede, which is made in two parts, *a b*, that are connected by a pivot, *c*, and nut *d*, so that they can be adjusted in a rectilinear or in an angular position toward each other.

Under this nut I have placed a spring or elastic washer, *s*, so that by screwing up the nut, sufficient friction is produced to retain the reach in position, while, if sufficient force is applied, the two parts of the reach can be readily brought in any desired position toward each other.

The rear end of the reach connects to the axle of the hind wheels B, on which is mounted a pinion, *e*, and to this pinion a revolving motion is imparted, by a train of gear-wheels and a spring, *f*, or by any other desirable motive-power which can be conveniently applied.

The front end of the reach rests upon the axle of the front wheel C, which represents the steering and driving-wheel, and to the ends of said axle are secured the cranks *g*, the wrist-pins of which are attached to the feet of an image, D, which may represent the figure of a man. The legs of this figure are jointed at the knees and hips, so that they can follow the motions of the cranks *g*.

If the spring *f* is wound up, and the two parts of the reach are adjusted in an angular position toward each other, the velocipede will run on a circular course, and it can be started in an ordinary room.

The motions of the image D will give to children or new beginners, in the act of driving a velocipede, an idea of what is required to operate a velocipede by foot-power.

If my velocipede is made large enough, a child can take the place of the image D, and it will receive a free ride, the velocipede being propelled entirely by the spring *f* or other motive-power acting on its hind wheels.

I do not claim a toy-velocipede, nor the motive-power thereto; but

What I claim as new, and desire to secure by Letters Patent, is—

The friction-joint in the connection between the front and hind wheels of a toy-velocipede, substantially as set forth.

ARTHUR M. ALLEN.

Witnesses:
W. HAUFF,
E. F. KASTENHUBER.